(12) United States Patent
Tremper

(10) Patent No.: US 8,966,811 B2
(45) Date of Patent: Mar. 3, 2015

(54) TACKLE BOX FOR UMBRELLA RIGS

(71) Applicant: James Tremper, Fredericksburg, VA (US)

(72) Inventor: James Tremper, Fredericksburg, VA (US)

( * ) Notice: Subject to any disclaimer, the term of this patent is extended or adjusted under 35 U.S.C. 154(b) by 235 days.

(21) Appl. No.: 13/573,729

(22) Filed: Oct. 5, 2012

(65) Prior Publication Data

US 2014/0096434 A1     Apr. 10, 2014

(51) Int. Cl.
*A01K 97/06*      (2006.01)

(52) U.S. Cl.
CPC ..................................... *A01K 97/06* (2013.01)
USPC ..................................... 43/54.1; 206/315.11

(58) Field of Classification Search
USPC ........... 43/54.1; 220/556, 555, 553, 500, 507; 206/372, 373, 571, 315.11
See application file for complete search history.

(56) References Cited

U.S. PATENT DOCUMENTS

| 4,271,624 A * | 6/1981 | Peluso ........................... 43/54.1 |
| 4,442,623 A | 4/1984 | Hawie |
| 2010/0307939 A1* | 12/2010 | Schmitt .................... 206/315.11 |
| 2011/0084078 A1* | 4/2011 | Twig et al. .................... 220/507 |
| 2013/0014703 A1* | 1/2013 | Flannery et al. .............. 119/474 |

* cited by examiner

*Primary Examiner* — David Parsley
*Assistant Examiner* — George Andonyan
(74) *Attorney, Agent, or Firm* — Thomas J. Wallen, P.E., Attorney at Law, L.L.C.; Eugene H. Eickholt

(57) ABSTRACT

A tackle box specifically designed to accommodate an umbrella rig, fully assembled with four hook elements at the ends of the arms, and one hook assembly in the center of the umbrella rig, is disclosed. The tackle box provides four separate compartment in the four corners of the tackle box, one for each of the four hook elements at the ends of the umbrella arms, whereby each of the four hook elements is isolated and cannot entangle each other. A fifth central compartment is designed to accommodate the fifth, central hook element of the umbrella rig. At least four compartments are interspaced between four corner compartments to store tackle.

11 Claims, 3 Drawing Sheets

TACKLE BOX FOR UMBRELLA RIGS

CROSS REFERENCE TO RELATED APPLICATIONS

None

STATEMENT REGARDING FEDERALLY SPONSORED RESEARCH OR DEVELOPMENT

Not Applicable

THE NAMES OF PARTIES TO A JOINT RESEARCH AGREEMENT

None

INCORPORATION-BY-REFERENCE OF MATERIAL SUBMITTED ON A COMPACT DISK

None

BACKGROUND OF THE INVENTION

Figure 1:
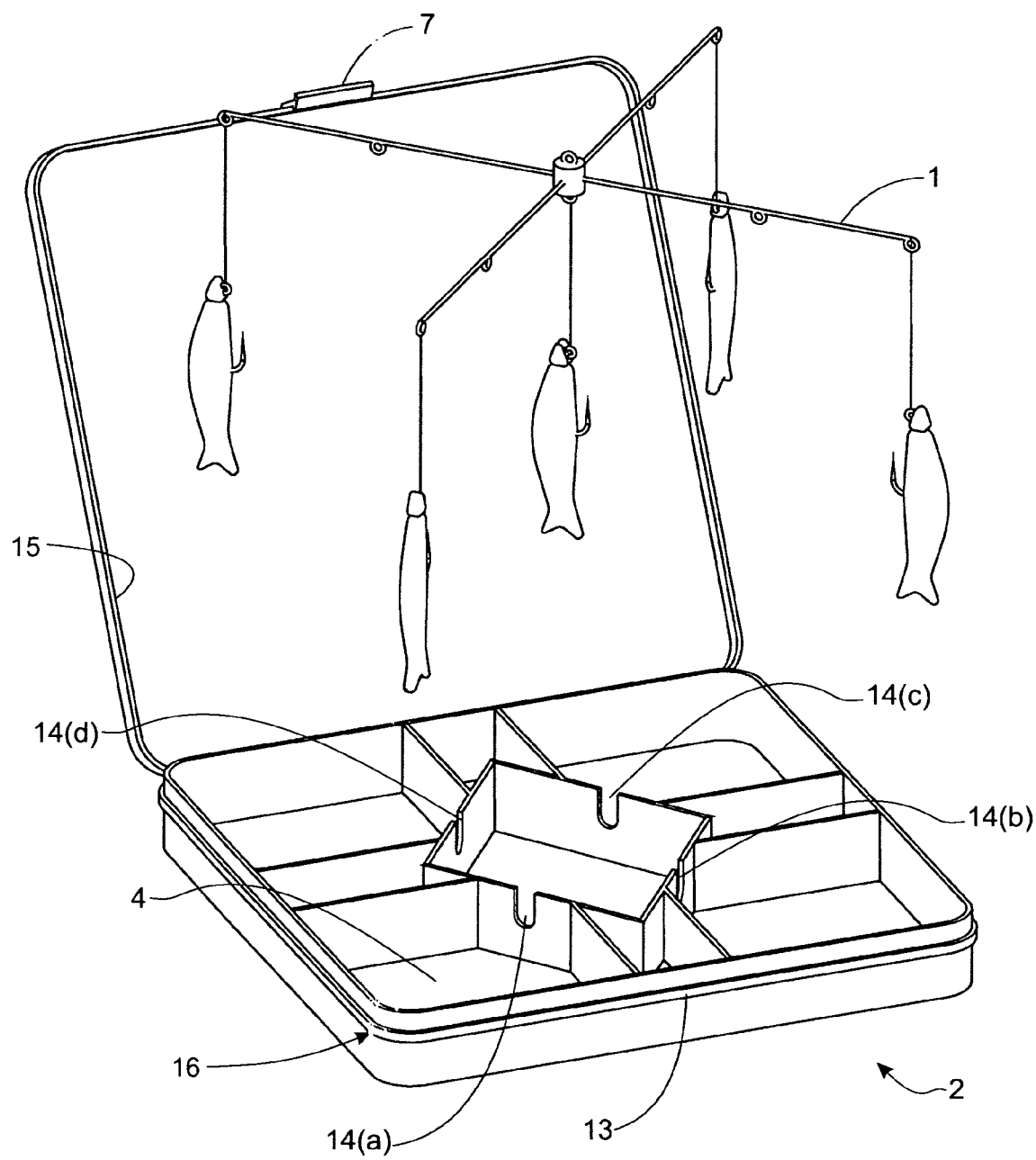

"Umbrella" rigs are commonly-used conventional fishing accessories which are designed to accommodate a plurality of fish hooks, lures, jigs, tube eels or similar fish hook devices suspended in spaced relation outwardly and downwardly from a single central fish line. Such rigs comprise a central support to which the fish line is attached, and generally two rigid but flexible diagonal wires which extend through and are attached to the support on slightly different planes and at right angles relative to each other to provide four wire arms having spaced termini, each which is adapted to have a fish hook device attached thereto and suspended therefrom to provide four spaced fish hook devices suspended from a single fish line attached to the central support. The support may also have a fish hook device suspended directly therefrom to provide a fifth such device, equispaced between the other four devices.

Such "umbrella" rigs generally are marketed in three standard sizes, as measured by the length of the two diagonal wires, the centers of which are attached to the central support. Such sizes are fifteen inches, twenty inches (most common) and twenty-five inches. While such rigs function well for their intended purpose, they present serious storage and handling problems due to their dimensions and due to the plurality of fish hook devices suspended therefrom. Also, such rigs, per se, are generally sold either unpacked or in original shrink packs or blister packs which support the rigs with the wires extended in normal use position, thereby requiring packs which are at least as long and wide as the size of the rig, i.e., twenty inches by twenty inches in the case of twenty-inch rigs. However, the rigs are also sold in flexed condition in long plastic bags.

Umbrella rigs containing the fish hook devices present important problems of storage and handling. The amount of storage space on a boat or in a fishing tackle box is quite limited and, therefore, umbrella rigs are difficult to store during periods of non-use. Also, one or more fishhook devices are generally suspended from each of the arms by a line so as to have a length of up to one or two feet or more down from each arm of the umbrella rig. The plurality of such devices coupled with the dangerous hooks thereon and the spread dimensions of the umbrella rig make it difficult to handle and store such loaded rigs without entanglement, injury and/or catching of the hooks in the clothing or boat parts.

Commonly, users will remove the spaced fishhook devices from the umbrella rig, i.e., unload the rig, to facilitate handling and storage. This is time-consuming and also disarms the rig so that it cannot be reused without reloading.

U.S. Pat. No. 4,442,623 issued to Robert W. Hawlie, relates to a storage device for umbrella rigs. However, in the Hawlie patent, the umbrella rig is stored in a folded condition, enabling the arms and hook devices thereon to become easily entangled. The present invention seeks to overcome this problem by providing a tackle box that is specifically designed to store umbrella hooks in a fully operational mode, ready to fish.

BRIEF SUMMARY OF THE INVENTION

The present invention attempts to overcome the deficiencies in the prior art umbrella rig storage containers, providing a tackle box in which an umbrella rig can be quickly stored, without disassembly. When placed in the instant tackle box, the umbrella rig arms with hook devices thereon cannot become entangled. Nor can the rig become entangled with other rigs, as the tackle box readily and instantly isolates the entire rig from other rigs. The novel tackle box also isolates each individual hook device on the four arms from each other.

BRIEF DESCRIPTION OF THE SEVERAL FIGURES OF THE DRAWINGS

FIG. 1 shows the preferred embodiment of the tackle box of the invention in an open position, with an umbrella rig ready to drop into the box. The hinge between the top and bottom of the box is a weakened portion, and the entire box is one-piece.

Figure 2:
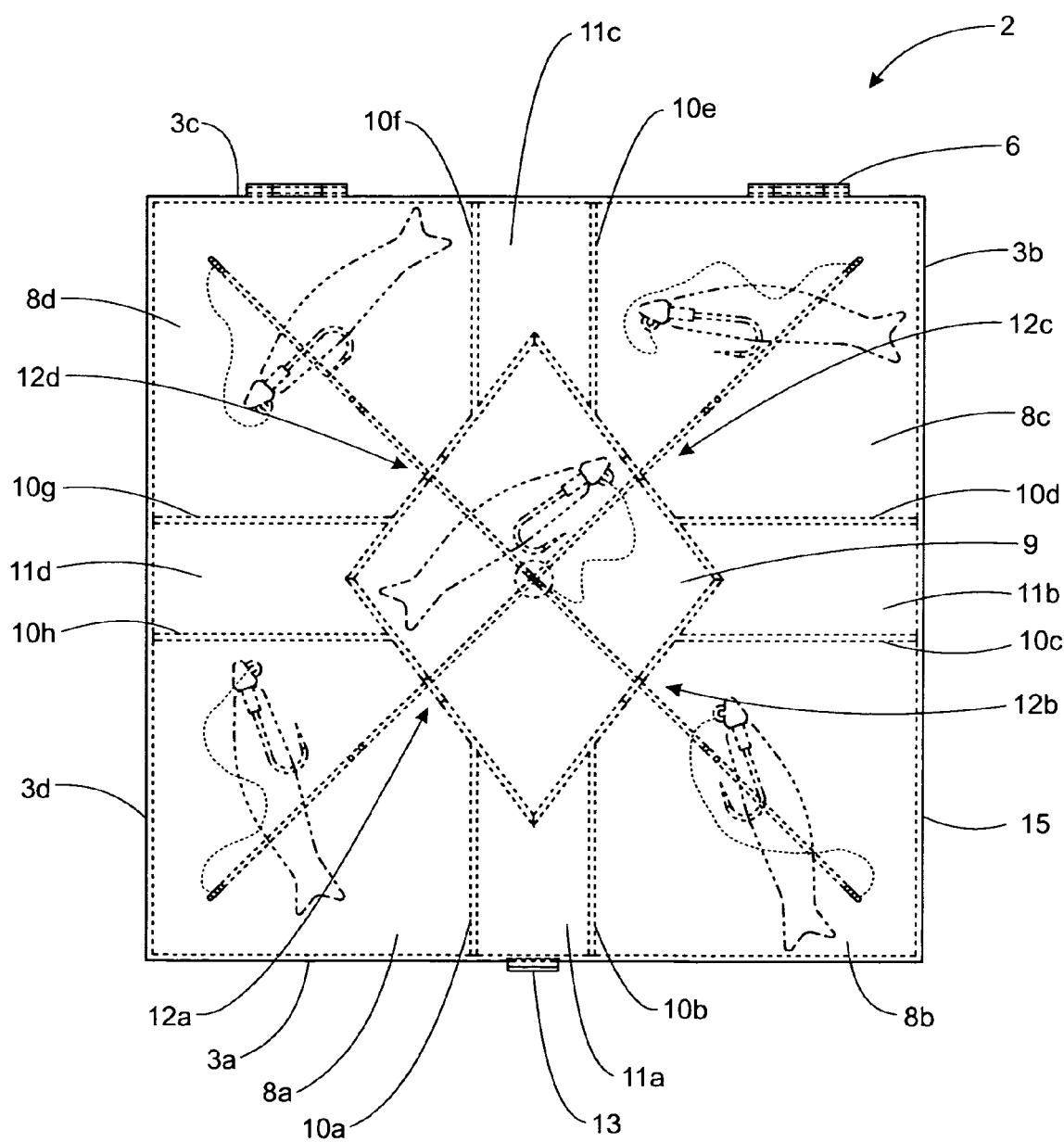

FIG. 2 shows the tackle box of the invention in a closed position with an umbrella rig stored therein, as seen looking down onto the top of the tackle box, in plan view. Here, two hinges are integrally formed into the top portion (5) and bottom of the box, on back-side portion (3c). The box of FIG. 2 is made in two portions, which are snapped together at the hinges (6).

Figure 3:
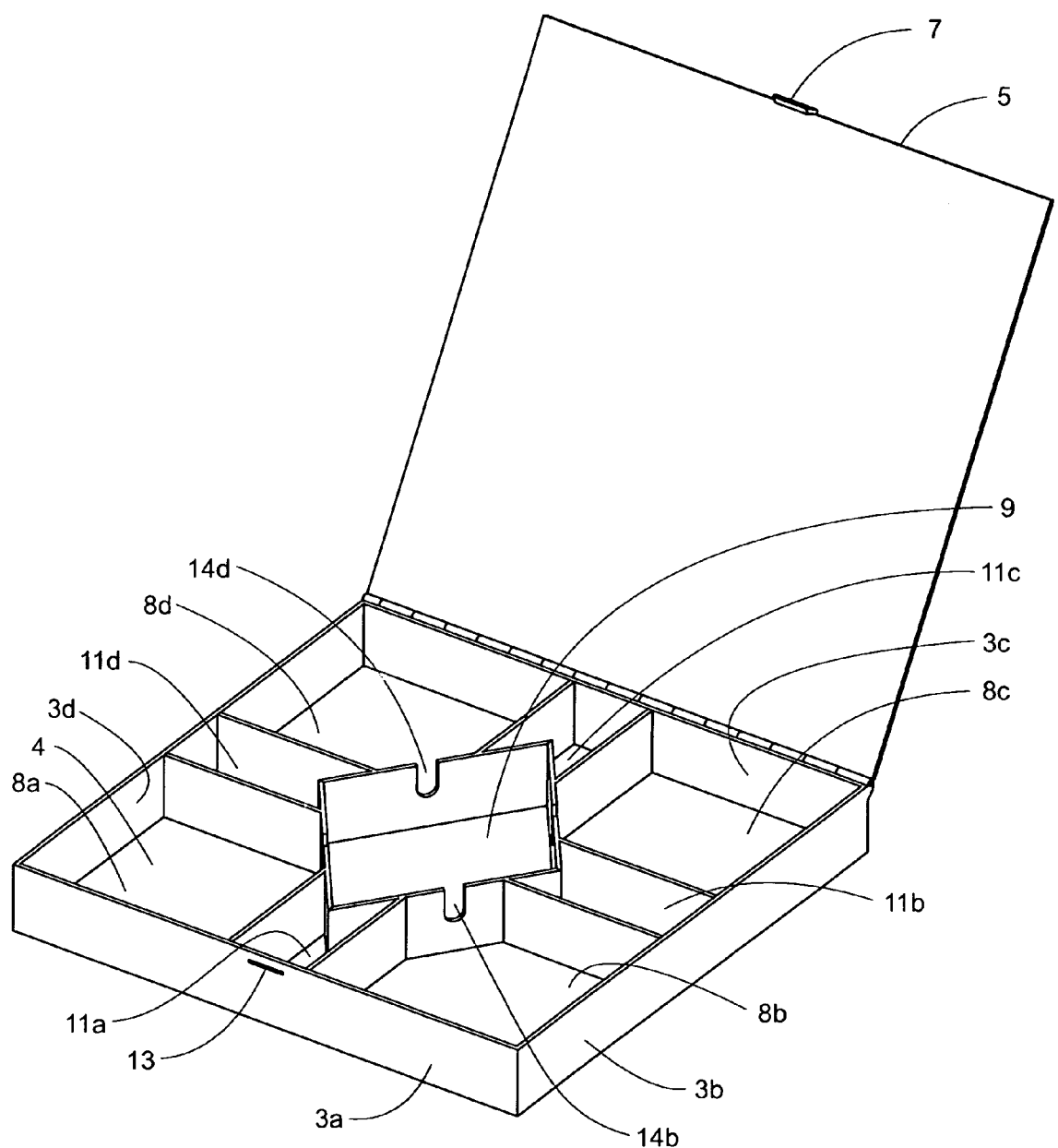

FIG. 3 shows an alternative embodiment of the tackle box according to the invention in an open position, in an empty condition. In FIG. 3 the hinge (6) extends across the entire width of the box between top (5) and back-side portion (3c).

DETAILED DESCRIPTION OF THE INVENTION

Referring to FIG. 1, umbrella rig (1) is shown overlying tackle box (2). Tackle box (2), as best seen in FIG. 2 is arranged in the shape of a square or rectangle, formed from four side portions (3a) through (3d), the side portions surrounding one bottom portion (4); and the box includes one top portion (5), best seen in FIG. 3. Top (5) is engaged to the back-side portion (3c), as best seen in FIG. 2, with hinge (6). Hinge means (6) could be any conventional hinge, or a flexible weakened area, as is common with one-piece tackle or jewelry boxes. A single flexible weakened area (6), as depicted in FIG. 1, is the preferred hinge. It is understood that the invention is not limited to the exact type of hinge. As shown in FIG. 3, hinge (6) extends between the entire sidewall (3c) and top portion (5), commonly called a piano hinge. Alternatively, two or more discontinuous hinges could equally be utilized, between side portion (3c) and top (5), as seen in FIG. 2. In the preferred embodiment of FIG. 1 a one-piece top portion (5) and a one-piece bottom (4) including side portions (3a) through (3d) are formed from thermoplastic, with one or more hinges (6) integrally molded to connect the top and bottom portions. Hinge (6) comprises a weakened area, consisting of one or more planar sections of flexible thermoplastic, integrally fused between the top and bottom portions, that hingedly engage the top and bottom portions. The entire top portion, bottom portion, and hinge in the embodiment of FIG. 1 can be made in one-piece from thermoplastic material.

Where conventional hinges are formed from thermoplastic integrally with the top and bottom portion, the box is formed from two separate pieces, and snapped together at the hinges, as in FIGS. 2 and 3. Either the top or bottom portion includes the hinge pins, while the other portion includes a hinge knuckles. When a weakened area or areas comprise the hinge (6), the entire box is one-piece, as in FIG. 1.

As seen in FIG. 1, lip (15), located around the entire periphery of the top (5), and perpendicular thereto, exactly fits or nests over the top perimeter of sides (3a) through (3d). Boss (16) extends protrudes from and extends circumferentially around side portions (3a) through (3d), and is positioned exactly to engage and touch lip (15) when the box (2) is in a closed position. Closure (7) cooperates with element (13), located on the front-side (3a), to close the box and prevent top portion (5) from opening at an inappropriate moment. Closure (7) and element (13) could be a detent/slot arrangement, a simple clasp as shown, or a buckle type fastener all conventionally used with tackle boxes, tool boxes, etc. It is understood that the invention is not limited to the exact type of closure or clasp. In the preferred embodiment, the closure elements are integrally formed from thermoplastic, with element (7) formed on the top portion (5) and element (13) formed on the front-side portion (3a). Alternatively, several closure elements could be arranged symmetrically around the box, located on perimeter (15) and side portions (3a), (3b), and (3d). No closure means is necessary on the back-side portion (3c).

Referring to FIG. 2, peripheral lip (15) is arranged to exactly overlie or nest over side portions (3a) through (3d). Peripheral lip (15) is sized such that it will overlie and touch circumferential boss (16) when the box is in a closed position. Hinge (6) in FIG. 2 comprises conventional hinge elements formed from thermoplastic. The box of FIG. 2 is made in two parts and snapped together at the hinge means (6). It is expressly understood of course, that the hinges (6) in FIG. 2 could just as readily be a weakened contact point of planar thermoplastic, connecting the top and bottom portions. In this case, the box would be one-piece.

The interior of tackle box (2), as best seen in FIG. 2, is divided into four separate corner compartments (8a) through (8d), one at each of the four outside corners of the tackle box, and one central compartment (9), located in the center of tackle box (2). Central, interior compartment (9) is formed from four wall portions (12a), (12b), (12c), and (12d). Wall portions (12a) through (12d) are integrally formed with the bottom portion (4), and are perpendicular to both the top portion (5) and bottom portion (4). Eight interior wall portions (10a) through (10h) are arranged to form the four compartments (8a) through (8d). Interior wall portions (10a) through (10h) are integrally formed with bottom portion (4), and are perpendicular to both the bottom portion (4) and the top portion (5). As best seen in FIG. 2 the interior wall portions (10a) through (10h) are arranged in four parallel pairs, first pair (10a) and (10b), second pair (10c) and (10d), third pair (10e) and (10f), and fourth pair (10g) and (10h). The eight walls (10a) through (10g) are attached to the side-walls (3a) through (3d) and are also attached to the four walls (12a) through (12d). In this way, four additional side compartment (11a), (11b), (11c), and (11d) are formed, one between each corner compartment and the interior compartment (9). It is important to note that walls (12a) through (12d) are arranged at an angle of forty-five degrees relative to the side walls (3a) through (3d), such that each of the four parallel wall pairs enclose one of the four corners of central compartment (9). In this manner, the combination of the four side walls (3a) through (3d), the four pairs of parallel walls (10a/10b), (10c/10d), (10e/10f) and (10g/10h), and the four walls (12a) through (12d) form four corner compartments (8a) through (8d), four side compartments (11a) through (11d), and one central compartment (9), for a total of nine compartments. The four corners formed by the intersection of the four walls (12a) through (12d) are therefore disposed in the interior of the four compartments (11a) through (11d). It is also expressly contemplated one single circular wall (12) could replace the four walls (12a) through (12d), forming a round central compartment.

Four u-shaped cut-outs (14a) through (14d), as best seen in FIG. 1 are provided in the center of each of the four walls (12a) through (12d), at the region of walls (12) closest to top (5). The four cut-outs provide a space through which the arms of umbrella rig (1) can pass, allowing the umbrella rig (1) to drop into the tackle box (2) in a fully assembled manner, with the hook elements attached. Each of the four hook elements drop into outer compartments (8a) through (8d), where they cannot entangle each other, nor can they entangle anything else. Central compartment (9) stores the central hook element of the umbrella rig (1).

Compartments (11a) through (11d) are intended to store hook elements, rubber eels, sinker weights, swivels, or other tackle pieces. The tackle pieces in these compartments are separate from hook elements in the four corner compartments (8a) through (8d), preventing entanglement with the umbrella rig (1).

The exact shape of the four cut-outs located on wall portions (12a) through (12d) is not critical to the practice of the invention, so long as the cut-out provides a region through which each of the four arms of the umbrella rig can pass, and the top portion (5) can close without interference.

The exact shape of the central compartment (9) is not critical to practice the invention. For instance, central compartment (9) could be circular in shape, with only one circular wall portion. The important consideration is that the cut-out portions (14a) through (14d) face the four outer corners formed by the intersection of the four outer walls (3a) through (3d). Orientating the cut-out portions (14a) through (14d) in this manner ensures that the arms of the umbrella rig (1) bisect the four corner compartments (8a) through (8d), allowing the hook elements to drop easily into the center of the four corner compartments (8a) through (8d).

Alternatively, it is only necessary to have four walls (10), which intersect the interior walls (12), conveniently at the four corners where walls (12a) through (12b) intersect. However, with this embodiment, there will only be four corner compartments (8a) through (8d) and one central compartment (9). Alternatively, walls can be added to interpose between any or all of the parallel wall pairs (10a, 10b), (10c, 10d), (10e, 10f), or (10g, 10h). In this manner many more compartments for smaller sized tackle elements can be arranged.

The invention is conveniently made from thermoplastic in one-piece. When made in one-piece, the hinge (6) is normally a weakened area extending between the top (5) and the rear wall (3c). Tackle boxes are conventionally made in this manner, and the method of injection molding or thermoforming such thermoplastic boxes is well known. Thermoplastics are corrosion free, impact resistant, and inexpensive to manufacture. When using thermoplastic it is also possible to make the tackle box translucent or transparent, so that the contents are visible without opening the tackle box. However, it is expressly understood that the tackle box of the invention could easily be manufactured from materials such as metal or wood, in the manner that tackle boxes are conventionally made from these materials.

It is also contemplated that a plurality of the tackle boxes could be stacked one atop another, to store several umbrella rigs. Four protruding feet could be provided at each of the four corners on the bottom of the box. Corresponding depressions could be provided at the top four corners of the tackle box, such that the four depressions would be in register with the four feet of another tackle box. Other means enabling easy stacking are well known and need not be described here. In this manner, the boxes could readily be stacked.

The invention claimed is:

1. A tackle box using minimal space to hold umbrella rigs in a fully assembled and fully extended state, comprising a rectangular box formed from four side walls, one top portion, and one bottom portion, wherein hinge means connect the top portion and the bottom portion, a central compartment located in the interior of the tackle box comprising a wall integral with the bottom portion and perpendicular to the top and bottom portions, and first, second, third and fourth corner compartments, one corner compartment interior to each of the four outside corners of the box, the four compartments being shallow and open from above to permit lures on the arms of the umbrella rig to rest on the bottom portion, the central compartment also being shallow and open from above to permit a central lure to rest on the bottom portion, the corner compartments further including four wall portions integral with the bottom portion and perpendicular to both the top and bottom portions, and extending from each of the four side walls to the central compartment, wherein the central compartment includes four cut-outs in the top of the wall that forms the central compartment, through which arms of the umbrella rig may pass, where each cut-out faces one of the outside corners of the tackle box, the four cut-outs sized to accommodate each of the four arms of the umbrella rig, two of the four cut-outs aligned with the a first diagonal extending from the first and third corner compartments and the other two of the four cut-outs aligned with a second diagonal extending from the second and fourth corner compartments, the first diagonal extending along two of the four arms, the other two of the four arms aligned with the second diagonal such that the arms of the umbrella rig extend along the first and second diagonals, such that the top of the tackle box may close with the umbrella rig within the tackle box taking up minimal space while being fully assembled.

2. The tackle box of claim 1 wherein the hinge means is a weakened planar area of thermoplastic connecting the top and bottom portions, forming a one-piece box.

3. The tackle box of claim 1 wherein the hinge means comprises a two piece hinge, with the pin integrally formed on one of the top or bottom portion, and the knuckle integrally formed on the other of the top or bottom portion, and snapped together to form a two-piece box.

4. The tackle box of claim 1 wherein the hinge means is a piano-type hinge.

5. The tackle box of claim 1 wherein the four cut-outs of the central compartment are oriented such that the four arms of the umbrella rig bisect the four corner compartments, when the umbrella rig is stored in a fully assembled and fully extended position.

6. The tackle box of claim 2 wherein the central compartment comprises four walls integral with the bottom portion and perpendicular to the top and bottom portions, the four walls connected to form a four sided closed compartment.

7. The tackle box of claim 6 further including four pairs of parallel walls integrally connected to the bottom portion, and perpendicular to both the top and bottom portions, each pair of parallel walls extending perpendicularly from one of the four side walls, and extending to the central compartment, thereby forming one side compartment between each pair of corner compartments, and the central compartment.

8. The tackle box of claim 7 further including closure means to prevent the box from opening.

9. The tackle box of claim 7 further including a peripheral lip extending around and perpendicular to the top portion, wherein the peripheral lip nests over the side walls of the box when the box is in a closed position.

10. The tackle box of claim 8 wherein the closure means is a slot and detent combination, with the detent located on the top portion and the slot located on a side wall.

11. The tackle box of claim 9 further including a boss that protrudes from and is integral with the four side walls, and extends circumferentially around the side walls, such that the peripheral lip exactly fits over and touches the boss when the box is in a closed position.

* * * * *